United States Patent [19]

Couture

[11] Patent Number: 4,641,735

[45] Date of Patent: Feb. 10, 1987

[54] OVERLOAD CLUTCH WITH AUTOMATIC RESET

[76] Inventor: Gérard Couture, P.O. Box 8, Greenlay, Quebec, Canada

[21] Appl. No.: 739,103

[22] Filed: May 30, 1985

[51] Int. Cl.$^4$ .............................................. F16D 43/20
[52] U.S. Cl. ............................... 192/56 L; 192/104 C; 464/30
[58] Field of Search ............... 192/56 L, 104 C, 30 R; 464/30, 62

[56] References Cited

U.S. PATENT DOCUMENTS

| | | | |
|---|---|---|---|
| 1,230,560 | 6/1917 | Camp | 192/104 C X |
| 2,431,107 | 11/1947 | Brown | 192/56 R |
| 2,753,030 | 7/1956 | Wight | 192/56 L |
| 2,829,749 | 4/1958 | Thomson | 192/56 R |
| 2,938,622 | 5/1960 | Mau et al. | 198/232 |
| 3,161,286 | 12/1964 | Robinson et al. | 198/232 |
| 3,346,084 | 10/1967 | Heizer, Jr. | 192/56 L X |
| 3,943,950 | 3/1976 | Thur et al. | 192/56 L X |
| 3,952,864 | 4/1976 | Schlagel | 198/232 |
| 4,271,944 | 6/1981 | Hanson | 192/56 L |

FOREIGN PATENT DOCUMENTS

| | | |
|---|---|---|
| 277503 | 1/1928 | Canada . |
| 727982 | 2/1966 | Canada . |
| 897081 | 4/1972 | Canada . |
| 923450 | 3/1973 | Canada . |
| 18316 | of 1914 | United Kingdom ............. 192/56 L |

*Primary Examiner*—Rodney H. Bonck
*Assistant Examiner*—Richard M. Lorence

[57] ABSTRACT

There is disclosed a clutch which will release under overload and will reset automatically upon speed reduction of the driving element. Two radial bars are fixed to the driven shaft; a driving wheel is rotatably mounted on the driven shaft adjacent the bars, and pivotally carries a pair of diametrically-opposite elongated pawls biased by tension springs to a radially-inwardly-extending position within the driving wheel to engage the respective arms, whereby the driving wheel drives the driven shaft. Under overload, the arms cause outward pivotal movement of the pawls against the bias of the springs, whereby the arms are cleared by the pawls, which remain in outwardly-pivoted position under centrifugal force until speed reduction of the driving wheel. In a preferred embodiment, the center of gravity of the pawls, in their bar-engaging position, lies on the leading side of a straight line passing through the shaft axis and the pawl pivotal axes, whereby the centrifugal force exerted on the pawls assists the coil springs to keep the pawls in bar-engaging position and therefore permitting the use of springs with a smaller tension force, resulting in a smoother resetting of the clutch.

3 Claims, 5 Drawing Figures

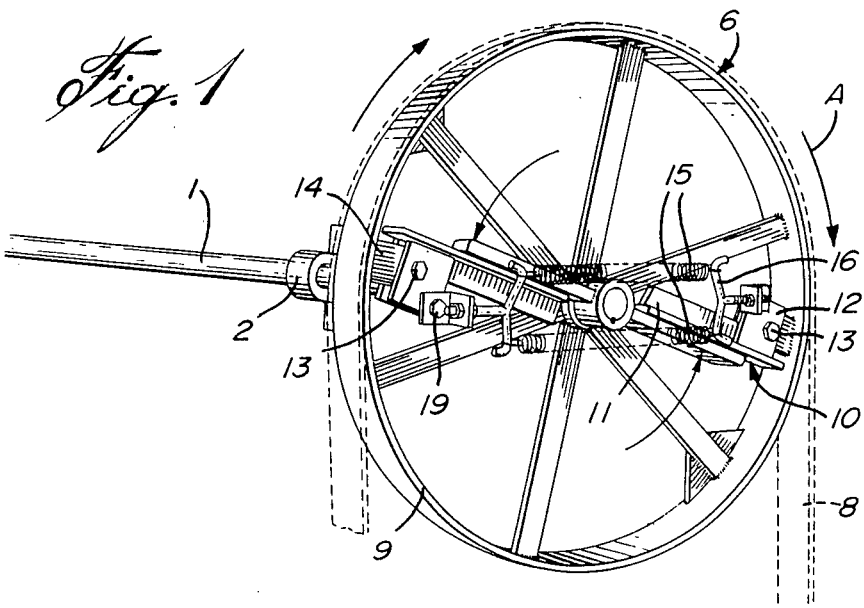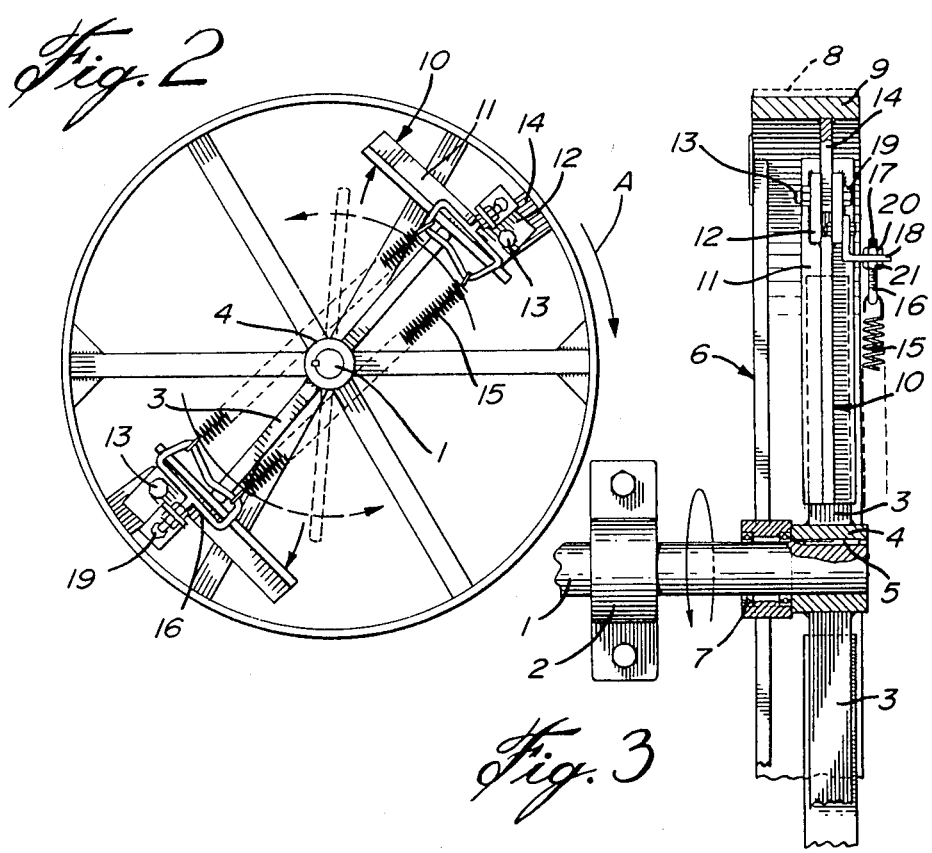

OVERLOAD CLUTCH WITH AUTOMATIC RESET

FIELD OF THE INVENTION

This invention relates to a clutch which releases under overload and resets automatically upon speed reduction of the driving element.

BACKGROUND OF THE INVENTION

U.S. Pat. No. 2,829,749 to E. Thomson dated Aug. 8, 1958 and entitled: SHOCK LOAD CLUTCH WITH AUTOMATIC RESET describes a clutch which will release when a shock load is applied thereto and that will reset automatically after the cause of the shock load has been removed and following a suitable reduction in the speed of the driving element of the clutch. This patent requires a shock load to operate, since it uses inertia discs to release the clutch. The clutch in accordance with this patent is described as remaining engaged during normal overloads. This clutch would therefore not be suitable for manure conveyors such as used in stables in which the clutch of the driving transmission for such conveyors must release when the conveyor exerts an overload. The discharge end of manure conveyors extends outside of the barn and form a ramp with the driving mechanism mounted at the outer upper end of the ramp and is therefore difficult of access. Existing clutches for such systems release under overload but cannot be automatically reset and, therefore, the operator has to climb up the ramp to manually reset the clutch after the overload has been corrected.

OBJECTS OF THE INVENTION

It is therefore the object of the present invention to provide a clutch adapted to be used in association with the transmission mechanism of a manure conveyor and which will reset automatically upon speed reduction of the driving element.

Another object of the invention is to provide a clutch of the character described, which can be used for other purposes and which is of simple and inexpensive construction and which resets in a smooth manner.

SUMMARY OF THE INVENTION

The clutch of the invention comprises a driven shaft, at least one bar fixed to said shaft and extending radially thereof, a driving wheel coaxially mounted relative to said driven shaft, at least one L-shaped pawl having an elongated, straight main portion and a transverse outer end portion, with said pawl pivotally carried by said driving wheel at its outer portion for pivotal movement about a pawl pivotal axis in a plane generally normal to the driven shaft between a bar-engaging position and a bar-releasing position, the pawl main portion extending generally radially inwardly towards the shaft and engaging the bar in its bar-engaging position and pivoting outwardly to its bar-releasing position, in order to clear the radially outer end of the bar, bias means being provided to urge the pawl to its bar-engaging position. The pawl, when in bar-releasing position, remains in this position under centrifugal force until the driving wheel is decelerated sufficiently to permit the pawl to take its bar-engaging position under the action of said bias means. When the pawl is in bar-engaging position, its center of gravity lies on the leading side of a straight line passing through the shaft axis and the pawl pivotal axis, whereby centrifugal force assists the bias means to keep the pawl in bar-engaging position, with the advantage that bias means of relatively small force can be used, resulting in a smoother resetting of the clutch. Preferably, means are provided to adjust the amount of overload which will release the clutch.

BRIEF DESCRIPTION OF THE DRAWINGS

FIG. 1 is a perspective view of the first embodiment of the clutch in engaged position, also showing, in dotted lines, the driving transmission belt;

FIG. 2 is an elevation of the clutch in its released position;

FIG. 3 is a fragmentary section of the clutch in its engaged position;

DETAILED DESCRIPTION OF THE DRAWINGS

Figure 4:
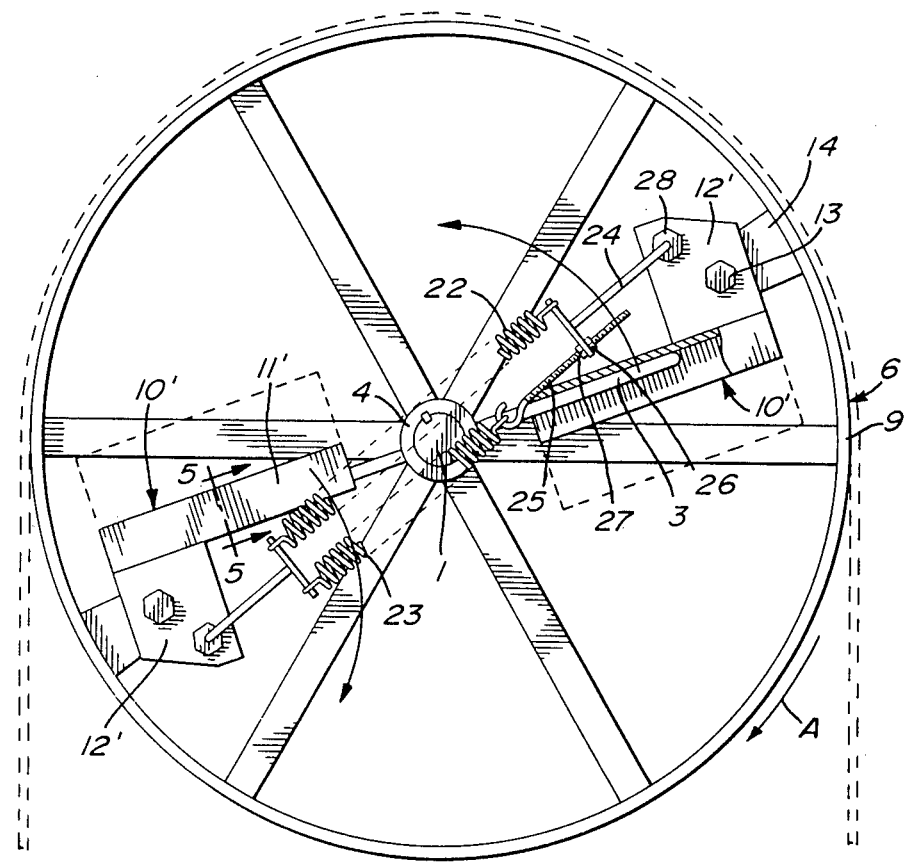
FIG. 4 is an elevation of a second embodiment, partially in section, and showing the clutch in engaged position and the transmission belt in dotted lines.

Referring to the embodiment shown in FIGS. 1, 2 and 3, there is shown a driven shaft 1 journalled in suitable brackets, one of which is shown at 2. A pair of radially-extending and diametrically-opposed identical bars 3 are fixed to a hub 4 which is in turn keyed at 5 to the outer end of driven shaft 1. A driving wheel 6 is freely rotatably mounted on driven shaft 1 adjacent bars 3 and hub 4 through a ball bearing arrangement 7. Driving wheel 6 is driven, for instance, by a transmission belt 8 trained on the rim 9 of the driving wheel 6, the belt being in turn driven, for instance, by an electric motor. The driving wheel 6 rotates in the direction of arrow A. A pair of pawls 10, each consisting of a main straight portion 11, of T-shape cross-section and of a laterally-extending outer portion 12, are pivoted at their outer portion 12 about pivot bolts 13 carried by brackets 14 inwardly radially extending from and secured to the rim 9. The two pawls 10 are of generally identical construction and their pivot bolts 13 lies along a straight line which passes through the axis of driven shaft 1. Also, the pivot bolts 13 are diametrically opposed and equally spaced from the driven shaft axis. The pivot bolts 13 lie on the trailing side of the main portion 11, which are adapted to contact the respective bars 3. The respective pawls 10 can pivot in the general plane of the driving wheel 6, that is in a plane normal to the driven shaft between a bar-engaging position and a bar-releasing position. In the bar-engaging position, the main portion 11 extends radially inwardly from the pivot bolts 13 and contacts the bars 3 along the length thereof. The pawls can pivot radially outwardly about their pivot bolts 13 sufficiently to clear the outer ends of the respective bar 3. Bias means are provided to resiliently maintain the respective pawls 10 in their bar-engaging position. These bias means preferably include a pair of similar tension coil springs 15 which extend diametrically of driving wheel 6 and are equally spaced on each side of the driven shaft axis, the outer ends of the tension springs being respectively hooked onto double hook T-shape members 16, the main threaded legs 17 of which extends through a hole of L-shape brackets 18, the brackets 18 being rotatably secured by bolt 19 to the outer portion 12 of the respective pawls 10 at a point which is more distant from said main portion 11 than pivot bolt 13. The tension of the coil spring 15 can be adjusted by means of nuts 20 threadedly engaging the threaded leg 17 of the hook members 16, there being also provided lock nuts 21. Therefore, the two tension springs 15 constantly urge the two pawls 10 towards bar-engaging position but with a decreasing force.

Supposing the driving wheel 6 rotates at a substantially constant speed of, say, 400 r.p.m., the bars 3 of the driven shaft 1 will cause opening movement of the respective pawls 10, as shown in FIG. 2, upon an overload exerted by the driven shaft 1 on the clutch, thereby releasing the clutch. The pawls 10 in their bar-releasing position, will remain in this position under the action of centrifugal force, since the center of gravity of the respective pawls lies beyond the bolts 19 with respect to the pivot bolts 13; in other words, the center of gravity of the pawls 10 lies on the trailing side of a straight line passing through the shaft axis and the two pawl pivotal axes. The pawls will remain in open position against the bias of the springs 15 until the driving wheel 6 is sufficiently decelerated, at which point the pawls will automatically pivot to their bar-engaging position and reset the clutch.

The amount of overload necessary to release the clutch can be adjusted by adjusting the tension of coil springs 15. In the embodiment of FIGS. 1, 2, and 3, the center of gravity of pawls 10, when the latter are in bar-engaging position, substantially lies on a straight line passing through the shaft axis and, therefore, the coil springs 15 must be sufficiently strong to maintain the clutch in engaged position under normal load condition.

Figure 5:
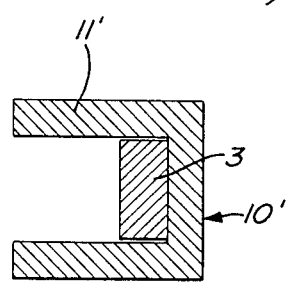
FIG. 5 is a cross-section, taken along line 5—5 of FIG. 4.

FIGS. 4 and 5 show a preferred embodiment of the clutch with the advantage that springs of smaller strength can be used, with a resulting smoother resetting of the clutch. The embodiment of FIGS. 4 and 5 have also the advantage of a more positive and guided engagement of the pawls with the driven shaft bars and of a more precise adjustment to the extent of the overload needed to release the clutch.

In the second embodiment, parts similar to those of the first embodiment are indicated by the same reference numerals. The pawls 10' have a main portion 11' which is of U-shaped cross-section, as shown in FIG. 5, to receive the respective bars 3 in the engaged position of the clutch.

In this position, the center of gravity of the respective pawls 10' lies on the leading side of a straight line passing through the shaft axis and through the two pivot bolts 13 which constitute the pivotal axes of the pawls 10'. Therefore, centrifugal force exerted on the two pawls 10' tend to maintain said two pawls in bar-engaging position, thereby assisting the action of the two tension coil springs 22 and 23. These two springs can therefore be of a lesser strength than the coil springs 15 of the first embodiment.

Longer tension spring 22 is attached, at both ends directly to a T-shape connector 24, while the shorter spring 23 is attached to the same connector 24 at one end, while its other end is attached to threaded hook 25 adjustably secured to the opposite connector 24 by means of a nut 26 provided with lock nut 27. The outer end of the connectors 24 is welded or otherwise secured to a bolt 28 rotatable in the outer end portion 12' of the respective pawls 10'. The longer spring 22 is selected to provide release at minimum overload, while the shorter spring 23 is adjustable in accordance with the total desired tension necessary to effect release at the required overload. The clutch of the invention is particularly suitable for use in the transmission unit of a manure conveyor for stables, because of its automatically resetting feature. When an overload occurs produced by the manure conveyor chain, the clutch releases and a signal may warn the operator who, after having cleared the obstruction causing the overload, simply throws off the switch controlling the electric motor driving the wheel 6 until this wheel 6 has sufficiently decelerated, say to about 15 r.p.m., at which point the clutch resets. After the obstruction causing the overload has been cleared, the operator starts the driving motor again.

The tension adjusting characteristics of the springs 15, 23 enable the clutch to be easily adapted to various installations of manure conveyors which, due to their various lengths amongst other characteristics, may constitute a load of variable amount.

Also, the width of the legs or wings of the main portion 11' of pawls 10' can be varied, in proportion with a specific range of loads.

Referring to FIGS. 1, 4, and 2, it is obvious that the double hook T-shape members 16 or 24 can be replaced, for instance, by a closed loop fastener, as shown in FIG. 2.

What I claim is:

1. A clutch comprising a driven shaft, a first bar fixed to said shaft, extending radially thereof and having a radially outer end, a driving wheel coaxially mounted relative to said driven shaft for rotation in a given rotational direction, an L-shaped first pawl having an elongated, straight, main inner end portion, and a transverse outer end portion, said first pawl pivotally carried by said driving wheel at its outer end portion for pivotal movement of said first pawl about a pawl pivotal axis in a plane generally parallel to said driving wheel between a bar-engaging position and a bar-releasing position, said main portion, when in said bar-engaging position, extending from said outer end portion generally radially inwardly towards said shaft and abutting against said first bar, said first pawl pivoting radially outwardly to clear the radially outer end of said first bar during passage from said bar-engaging position to said bar-releasing position, bias means biasing said first pawl to said bar-engaging position, and wherein in said bar-engaging position, said outer end portion extends from said elongated main portion in a direction opposite said given rotational direction, a radial line passing through said shaft axis and pawl pivotal axis defining on each side thereof in the rotational plane of said wheel, a leading area and a trailing area relative to said given rotational direction, the center of gravity of said pawl being located in said leading area when in bar-engaging position and being located in said trailing area in said bar-releasing position, whereby centrifugal force exerted on said pawl assists said biasing means to keep said pawl in bar-engaging position and a overload exerted by said driven shaft causes pivotal movement of said pawl to bar-releasing position and said pawl is maintained by centrifugal force in said bar-releasing position against bias of said biasing means, said biasing means returning said pawl to bar-engaging position upon sufficient decrease of the rotational speed of said driving wheel.

2. A clutch as defined in claim 1, wherein a second bar is fixed to said shaft and radially extends away thereof in a direction diametrically opposite to said first bar and of a length equal to that of said first bar, and further including a second pawl identical to said first pawl, also pivotally carried by said driving wheel for pivotal movement in a plane generally normal to said driven shaft about a pivotal axis which is diametrically opposite to the pivotal axis of said first pawl and equally distant from the shaft axis, said bias means including a pair of tension coil springs extending between the outer end portion of said two pawls and connector means attaching the opposite ends of said coil springs to points of the respective outer end portions, which are more distant from the respective main portions than said pawl pivotal axes, said connector means including means to adjust the tension of at least one of said springs.

3. A clutch as defined in claim 1, wherein the main portion of each of said pawls is of U-shape cross-section to receive and guide the respective bars in the bar-engaging position of said pawl.

* * * * *